United States Patent
Higbie

(10) Patent No.: US 10,706,436 B2
(45) Date of Patent: Jul. 7, 2020

(54) CROWD PRICING SYSTEM AND METHOD HAVING TIER-BASED RATINGS

(71) Applicant: Colin Laird Higbie, Orange, NH (US)

(72) Inventor: Colin Laird Higbie, Orange, NH (US)

(*) Notice: Subject to any disclaimer, the term of this patent is extended or adjusted under 35 U.S.C. 154(b) by 109 days.

(21) Appl. No.: 15/664,201

(22) Filed: Jul. 31, 2017

(65) Prior Publication Data

US 2017/0330212 A1    Nov. 16, 2017

Related U.S. Application Data

(62) Division of application No. 14/286,528, filed on May 23, 2014, now abandoned.

(60) Provisional application No. 61/827,574, filed on May 25, 2013.

(51) Int. Cl.
*G06Q 30/02* (2012.01)
*G06Q 50/00* (2012.01)
*H04N 21/24* (2011.01)

(52) U.S. Cl.
CPC ......... *G06Q 30/0206* (2013.01); *G06Q 30/02* (2013.01); *G06Q 30/0283* (2013.01); *H04N 21/2407* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,124,099 B2 | 10/2006 | Mesaros | |
| 7,447,646 B1 * | 11/2008 | Agarwal | G06Q 20/201 705/26.3 |
| 7,584,118 B1 | 9/2009 | Bellare et al. | |
| 7,693,748 B1 * | 4/2010 | Mesaros | G06Q 30/06 705/1.1 |
| 7,739,153 B1 | 6/2010 | Anderson | 705/26.64 |
| 8,341,195 B1 * | 12/2012 | Cole | G06Q 30/02 705/51 |

(Continued)

OTHER PUBLICATIONS

Office Action issued in U.S. Appl. No. 14/286,528, dated Mar. 30, 2017 (41 pgs).

(Continued)

*Primary Examiner* — Patricia H Munson
*Assistant Examiner* — Crystol Stewart
(74) *Attorney, Agent, or Firm* — Hayes Soloway P.C.

(57) ABSTRACT

A crowd pricing system and method having tier-based ratings includes a pricing table hosted on a memory. The pricing table has a plurality of pricing tiers, wherein the pricing table is correlated to at least one downloadable media item. A download popularity value is calculated based on a quantity of downloads of the at least one downloadable media item within an evaluation period, wherein a position of the at least one downloadable media item is movable between the plurality of pricing tiers based on the download popularity value, wherein position movement of the at least one downloadable media item is regulated by at least one control factor. A ratings designation is paired with each of the plurality of pricing tiers, the ratings designation having a cumulative user ratings score calculated by the processor, wherein the cumulative user ratings score provides an indication of cumulative user rating of the at least one downloadable media item.

19 Claims, 5 Drawing Sheets

(56) References Cited

U.S. PATENT DOCUMENTS

| | | | | |
|---|---|---|---|---|
| 8,626,605 | B2* | 1/2014 | Mesaros | G06Q 30/0627 705/26.63 |
| 9,609,374 | B2* | 3/2017 | Peterson | H04N 21/2543 |
| 9,799,059 | B1* | 10/2017 | Curtis | G06Q 30/0283 |
| 2001/0047413 | A1 | 11/2001 | Landau et al. | |
| 2002/0053078 | A1 | 5/2002 | Holtz et al. | |
| 2005/0119936 | A1 | 6/2005 | Buchanan et al. | |
| 2005/0256778 | A1* | 11/2005 | Boyd | G06Q 30/0244 705/14.43 |
| 2006/0206385 | A1* | 9/2006 | Walker | G06Q 20/202 705/21 |
| 2007/0033092 | A1* | 2/2007 | Iams | G06Q 10/0639 705/7.32 |
| 2007/0100777 | A1 | 5/2007 | Floyd | 705/400 |
| 2008/0027827 | A1 | 1/2008 | Eglen et al. | 705/26 |
| 2008/0120287 | A1* | 5/2008 | Guan | G06Q 30/02 |
| 2008/0140433 | A1 | 6/2008 | Levy et al. | |
| 2008/0154798 | A1 | 6/2008 | Valz | 705/400 |
| 2009/0019375 | A1 | 1/2009 | Garofalo | |
| 2009/0048860 | A1 | 2/2009 | Brotman | 700/26 |
| 2009/0055242 | A1 | 2/2009 | Rewari et al. | |
| 2009/0164383 | A1* | 6/2009 | Rothman | G06Q 30/0206 705/80 |
| 2009/0328093 | A1 | 12/2009 | Cansler | H04N 21/2668 |
| 2010/0063877 | A1 | 3/2010 | Soroca et al. | |
| 2010/0318542 | A1 | 12/2010 | Davis | G06F 17/30038 |
| 2010/0332296 | A1 | 12/2010 | Gharabally | 705/14.2 |
| 2011/0082703 | A1* | 4/2011 | Higbie | G06Q 30/0206 705/1.1 |
| 2011/0082761 | A1* | 4/2011 | Eglen | G06Q 10/00 705/26.1 |
| 2011/0295722 | A1 | 12/2011 | Reisman | 750/27.1 |
| 2012/0197705 | A1* | 8/2012 | Mesaros | G06Q 30/0222 705/14.23 |
| 2012/0221396 | A1 | 8/2012 | Eglen | 705/14.24 |
| 2012/0239663 | A1 | 9/2012 | Tzruya | G06F 17/30867 |
| 2013/0060621 | A1 | 3/2013 | Walker | 705/14.23 |
| 2013/0103592 | A1 | 4/2013 | Shenk et al. | |
| 2013/0212039 | A1* | 8/2013 | Burckart | G06Q 30/02 705/347 |
| 2013/0246307 | A1 | 9/2013 | Sundaram | 705/36 R |
| 2013/0297581 | A1 | 11/2013 | Ghosh | G06F 17/30864 |
| 2014/0089053 | A1 | 3/2014 | Iorga | 705/7.35 |
| 2014/0188584 | A1* | 7/2014 | Park | G06Q 30/02 705/14.16 |
| 2016/0078509 | A1 | 3/2016 | Yamano | G06Q 30/0609 |
| 2016/0275118 | A1 | 9/2016 | Ge et al. | G06F 17/30321 |
| 2016/0275192 | A1 | 9/2016 | Miao et al. | G06F 17/30867 |
| 2017/0308931 | A1* | 10/2017 | Jaeger | G06Q 30/0267 |

OTHER PUBLICATIONS

Office Action issued in U.S. Appl. No. 14/286,528, dated Nov. 17, 2016 (30 pgs).

U.S. Appl. No. 14/286,528, filed May 23, 2014.

Great Britain Examination Report issued in application No. GB1520636.0, dated Aug. 15, 2017 (7 pgs).

U.S. Appl. No. 15/638,138, filed Jun. 29, 2017, Higbie.

U.S. Appl. No. 16/372,265, filed Apr. 1, 2019, Higbie.

European Office Action issued in application No. 10 817 994.6, dated Dec. 22, 2017 (5 pg).

Notice of Allowance issued in U.S. Appl. No. 14/616,124, dated Aug. 15, 2018 (16 pgs).

Office Action issued in U.S. Appl. No. 12/886,502, dated Jun. 12, 2012 (9 pgs).

Office Action issued in U.S. Appl. No. 12/886,502, dated Oct. 2, 2013 (7 pgs).

Office Action issued in U.S. Appl. No. 13/893,151, dated Dec. 29, 2016 (15 pgs).

Office Action issued in U.S. Appl. No. 13/893,151, dated Jun. 6, 2016 (12 pgs).

Office Action issued in U.S. Appl. No. 13/893,151, dated Nov. 20, 2015 (7 pgs).

Office Action issued in U.S. Appl. No. 14/286,528, dated Aug. 11, 2017 (5 pgs).

Office Action issued in U.S. Appl. No. 14/616,124, dated May 4, 2017 (28 pgs).

Office Action issued in U.S. Appl. No. 14/616,124, dated Nov. 2, 2017 (26 pgs).

Yalin Wang et al., "Document Zone Content Classification and its Performance Evaluation", Pattern Recognition, Jan. 31, 2006. vol. 39, Issue I , pp. 57-73.

* cited by examiner

172

| | COMPLETED EVALUATION PERIOD | PRIOR EVALUATION PERIOD | 2ND PRIOR EVALUATION PERIOD | 3RD PRIOR EVALUATION PERIOD | ANY NUMBER OF ADDITIONAL COLUMNS MAY BE ADDED TO INCLUDE ADDITIONAL PRIOR EVALUATION PERIODS |
|---|---|---|---|---|---|
| FREE | 1 | 0 | 0 | 0 | |
| TIER 1 | 10 | 3 | 1 | 0 | |
| TIER 2 | 15 | 5 | 3 | 0 | |
| TIER 3 | 20 | 10 | 5 | 3 | |
| TIER 4 | 25 | 15 | 7 | 3 | |
| TIER 5 | 30 | 20 | 9 | 4 | |
| TIER 6 | 40 | 25 | 10 | 5 | |
| TIER 7 | 50 | 35 | 10 | 5 | |

FIG. 3

| Tier | Rating |
|---|---|
| $CP 8.99 | |
| $CP 6.99 | |
| $CP 4.99 | |
| $CP 2.99 | |
| $CP 0.99 | |
| $CP 0.49 | |
| $CP 0.29 | |
| $CP 0.00 | ★★★★★ |

FIG. 4

| Tier | Rating |
|---|---|
| $CP 8.99 | |
| $CP 6.99 | |
| $CP 4.99 | |
| $CP 2.99 | ★☆★☆☆ |
| $CP 0.99 | ★★★☆☆ |
| $CP 0.49 | ★★★★☆ |
| $CP 0.29 | ★★☆★☆ |
| $CP 0.00 | ★★☆☆☆ |

FIG. 5

| Tier | Rating |
|---|---|
| $CP 8.99 | ☆☆☆☆☆ |
| $CP 6.99 | ★★★★☆ |
| $CP 4.99 | ★☆☆☆☆ |
| $CP 2.99 | ★☆☆☆☆ |
| $CP 0.99 | ★☆☆☆☆ |
| $CP 0.49 | ☆★☆☆☆ |
| $CP 0.29 | ☆☆☆☆☆ |
| $CP 0.00 | ☆☆☆☆☆ |

FIG. 6

| Tier | Rating |
|---|---|
| $CP 8.99 | ★★★★☆ |
| $CP 6.99 | ☆☆☆☆☆ |
| $CP 4.99 | ☆☆★★☆ |
| $CP 2.99 | ☆☆☆☆☆ |
| $CP 0.99 | ☆☆☆★☆ |
| $CP 0.49 | ☆☆☆☆☆ |
| $CP 0.29 | ☆☆☆☆☆ |
| $CP 0.00 | ☆☆☆☆☆ |

FIG. 7

CROWD PRICING SYSTEM AND METHOD HAVING TIER-BASED RATINGS

CROSS REFERENCE TO RELATED APPLICATION

This application is a divisional application of U.S. application Ser. No. 14/286,528, filed May 23, 2014, which in turn claims benefit of U.S. Provisional Application Ser. No. 61/827,574 entitled, "Crowd-Pricing Improvements and Added Interactivity" filed May 25, 2013, the entire disclosure of which is incorporated herein by reference.

FIELD OF THE DISCLOSURE

The present disclosure is generally related to a pricing and ratings system, and more particularly is related to a crowd pricing system and method having tier-based ratings.

BACKGROUND OF THE DISCLOSURE

There exist business practices for sale of downloadable audio files, games, and other software. The Apple® App Store as a part of iTunes® is the best example of such a system. However, as these systems grow in number of applications, both customers and authors share in frustration of identifying the "good" apps. Prices are driven toward $0, as low pricing is necessary to achieve volume, and the market has become a loss leader for larger game studios to promote their titles on other platforms where they can control pricing or for independent developers who accept recognition in place of revenue.

While the prior art includes systems for sale of software and other digital content (audio, video, e-books, and other) online, and while the free market as a means of supply and demand price setting, there are no systems that combine these in an automated fashion. Furthermore, one of the largest complaints among developers and other digital content authors on popular downloading websites is that it is difficult to generate sufficient revenue, because prices are driven toward $0 in order to attract customers. Rating systems exist, but are too subjective and sales volumes remain largely a function of price.

Thus, a heretofore unaddressed need exists in the industry to address the aforementioned deficiencies and inadequacies.

SUMMARY OF THE DISCLOSURE

Embodiments of the present disclosure provide a computer-based crowd pricing system having tier-based ratings. Briefly described, in architecture, one embodiment of the system, among others, can be implemented as follows. A non-transitory memory has a plurality of instructions executable by a processor. A pricing table is hosted on the non-transitory memory, the pricing table having a plurality of pricing tiers, wherein the pricing table is correlated to at least one downloadable media item. A download popularity value is calculated based on a quantity of downloads of the at least one downloadable media item within an evaluation period, wherein a position of the at least one downloadable media item is movable between the plurality of pricing tiers based on the download popularity value, wherein position movement of the at least one downloadable media item is regulated by at least one control factor. A ratings designation is paired with each of the plurality of pricing tiers, the ratings designation having a cumulative user ratings score calculated by the processor, wherein the cumulative user ratings score provides an indication of cumulative user rating of the at least one downloadable media unit.

The present disclosure can also be viewed as providing a computerized system for providing interactive-based pricing tiers to a plurality of users. Briefly described, in architecture, one embodiment of the system, among others, can be implemented as follows. A non-transitory memory has a quantity of instructions executable by a processor. A plurality of modules is stored within the non-transitory memory, wherein the quantity of instructions are correlated with at least one of the plurality of modules, wherein the plurality of modules comprises: a pricing table module hosted on the non-transitory memory, the pricing table module visually displaying a pricing table having a plurality of pricing tiers on a display device, wherein the pricing table is correlated to at least one downloadable media item; a download popularity value module calculating a download popularity value based on a quantity of downloads of the at least one downloadable media item within an evaluation period, wherein a position of the at least one downloadable media item is movable between the plurality of pricing tiers based on the download popularity value, wherein position movement of the at least one downloadable media item is regulated by at least one control factor; and a ratings designation module providing a ratings designation, wherein the ratings designation is paired with each of the plurality of pricing tiers, each ratings designation having a cumulative user ratings score calculated by the processor, wherein the cumulative user ratings score provides an indication of cumulative user rating of the at least one downloadable media unit.

The present disclosure can also be viewed as providing a method for providing a crowd pricing system having tier-based ratings. In this regard, one embodiment of such a method, among others, can be broadly summarized by the following steps: hosting a pricing table on a non-transitory memory of a computerized device, the pricing table having a plurality of pricing tiers; correlating the pricing table to at least one downloadable media item; calculating a download popularity value based on a quantity of downloads of the at least one downloadable media item within an evaluation period; moving the at least one downloadable media item between the plurality of pricing tiers based on the calculated download popularity value; regulating position movement of the at least one downloadable media item with at least one control factor; and pairing at least one ratings designation with each of the plurality of pricing tiers, wherein each of the ratings designations having a cumulative user ratings score calculated by the processor, wherein the cumulative user ratings score provides an indication of cumulative user rating of the at least one downloadable media unit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a schematic illustration of a tier-points table used with the computer-based crowd pricing system having tier-based ratings, in accordance with the second exemplary embodiment of the present disclosure.

FIGS. 4-7 are illustrations of pricing tables having pricing tiers used with the computer-based crowd pricing system having tier-based ratings, in accordance with the second exemplary embodiment of the present disclosure.

DETAILED DESCRIPTION

Figure 1:
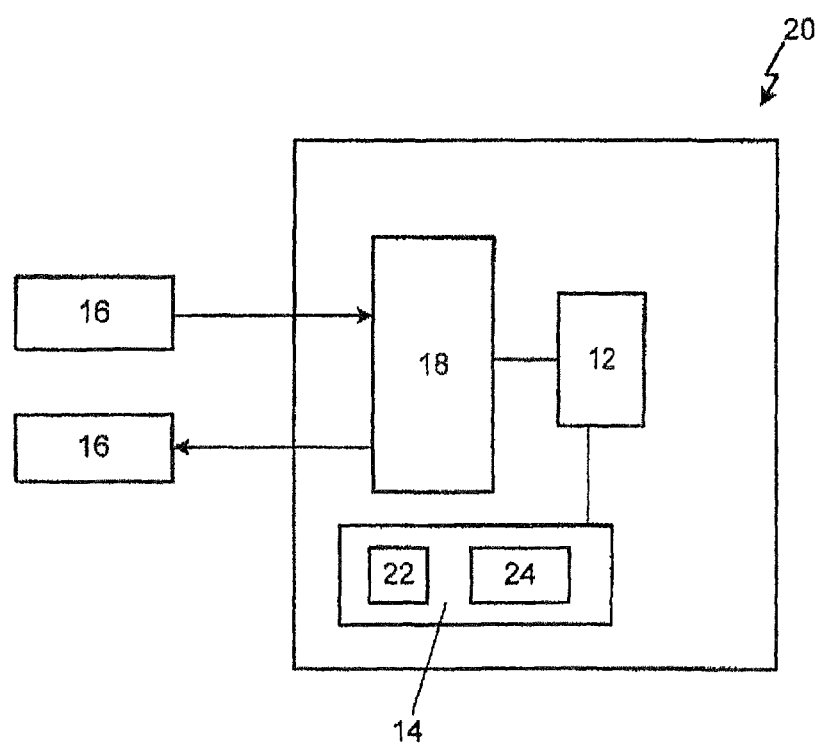
FIG. 1 is a schematic illustration of a general-purpose computer for use with the computer-based crowd pricing system having tier-based ratings, in accordance with a first exemplary embodiment of the present disclosure.

FIG. 1 is a schematic illustration of a general-purpose computer 10 for use with the computer-based crowd pricing system having tier-based ratings, in accordance with a first exemplary embodiment of the present disclosure. The general-purpose computer 10, which may be referred to simply as 'computerized device 10' or 'computer 10' herein, may include any components, in whole or in part, commonly used with a computerized device, but may also include a variety of additional components. Accordingly, the computer 10 of FIG. 1 is to provide clarity in describing the general functioning of a computing system and is not considered limiting to the present disclosure.

The computerized device 10 may include a variety of computer-based components, in whole and in part. For example, the computerized device 10 may be implemented in software (e.g., firmware), hardware, or a combination thereof. Commonly, the computerized device 10 is implemented with both hardware and software, such as a hard drive or memory that stores processor-executable code portions for carrying out instructions, calculations, or other tasks. The software or programmable code may be executed by any special or general purpose digital computer, such as a personal computer (PC; IBM-compatible, Apple-compatible, or otherwise), workstation, minicomputer, smart phone, tablet computer, or mainframe computer.

In terms of hardware architecture, as shown in FIG. 1, the computer 10 includes a processor 12, database 14, and one or more input and/or output (I/O) devices 16 (or peripherals) that are communicatively coupled via a local interface 18 (I/O interface). The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software, particularly that stored in the database 14. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, a Phenom II X4 975 BE from AMD, or a Pentium E5800 and/or Core I7-990X from Intel Corporation.

The database 14, which may often be referred to as 'memory,' can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the database 14 may incorporate electronic, magnetic, optical, and/or other types of storage media. Note that the database 14 can have a distributed architecture, where various components are situated remote from one another, but can be accessed by the processor 12. For example, the database 14 may have a partitioned drive for storage of data in separate and distinct areas with communication therebetween through the processor 12.

Figure 2:
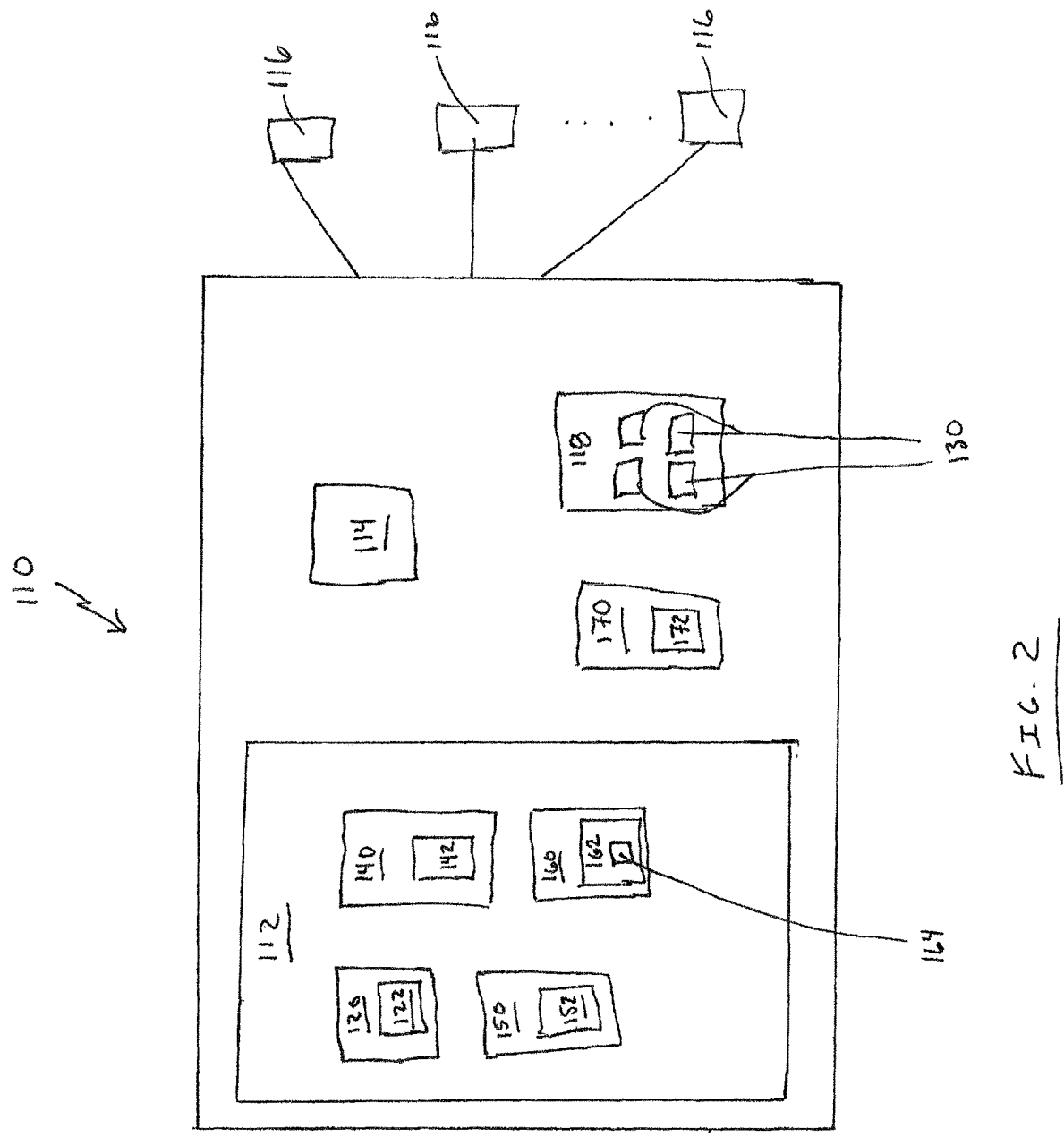
FIG. 2 is a schematic illustration of a computer-based crowd pricing system having tier-based ratings, in accordance with a second exemplary embodiment of the present disclosure.

The software in the database 14 may include one or more separate programs, each of which comprises an ordered listing of executable instructions for implementing logical functions. In the example of FIG. 2, the software in the database 14 may include an operating system (O/S) 22, which manages computer hardware resources and provides common services for execution of various software applications 24. A nonexhaustive list of examples of suitable commercially available operating systems 22 includes Windows operating system available from Microsoft Corporation, a Netware operating system available from Novell, Inc., a Macintosh operating system available from Apple Computer, Inc., a UNIX operating system, which is available for purchase from many vendors, such as the Hewlett-Packard Company, Sun Microsystems, Inc., and AT&T Corporation, a LINUX operating system, which is freeware that is readily available on the Internet, a run time Vxworks operating system from WindRiver Systems, Inc., and an appliance-based operating system, such as that implemented in handheld computers or personal data assistants (PDAs) (e.g., PalmOS available from Palm Computing, Inc., and Windows CE available from Microsoft Corporation), tablet computers, smart phones and other mobile computing devices.

The operating system 22 may control the execution of other computer programs, namely software applications 24, and provides scheduling, input-output control, file and data management, memory management, and communication control and related services. The software applications 24 may include any type of computer program or software that is installed, downloaded, or otherwise stored, at least in part, in the database 14. Software applications 24 may include activity or function-specific programs and general functioning programs. For example, a nonexhaustive list of software applications 24 includes programs for word processing (i.e., MS Office Suite available from the Microsoft Corporation), data-processing, image processing (i.e., Creative Suite or Adobe Reader available from Adobe Systems, Inc.), gaming, anti-virus, and communication (i.e., AOL Instant Messenger available from America On-Line), or any other software program. Additionally, it is noted that software applications 24 are commonly referred to as 'Apps.'

The software application 24 on the computer 10 may include a source program, executable program (object code), script, or any other entity comprising a set of instructions to be performed. When a source program, then the program needs to be translated via a compiler, assembler, interpreter, or the like, which may or may not be included within the memory 14, so as to operate properly in connection with the O/S 22. Furthermore, the software application 24 may be written as an object oriented programming language, which has classes of data and methods, or a procedure programming language, which has routines, subroutines, and/or functions, for example but not limited to, C, C++, Pascal, Basic, Fortran, Cobol, Perl, Java, and Ada.

The I/O devices 16 may include input devices, for example but not limited to, a keyboard, mouse, scanner, microphone, communication connection, or other computerized device, etc. Furthermore, the I/O devices 16 may also include output devices, for example but not limited to, a printer, display, etc. The I/O devices 16 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 10 is a PC, workstation, or the like, the software in the database 14 may further include a basic input output system (BIOS) (omitted for simplicity). The BIOS is a set of essential software routines that initialize and test hardware at startup, start the O/S 22, and support the transfer of data among the hardware devices. The BIOS is stored in ROM so that the BIOS can be executed when the computer 10 is activated. When the computer 10 is in operation, the processor 12 is configured to execute software stored within the database 14, to communicate data to and from the database 14, and to generally control operations of the computer 10 pursuant to the software. The O/S 22, in whole or in part, but typically the latter, are read by the processor 12, perhaps buffered within the processor 12, and then executed.

The computer 10 can include software applications 24 which can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The computer 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Alternatively, functioning of the computer 10 may be implemented in hardware, which may require any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is noted that the computer 10 may be a single unitary device having the various components housed therein, or a plurality of interconnected devices connected through a communication connection. Communication connections may include wired connections, wireless connections, connections through other devices (servers), and connections through a network. For example, a plurality of computers 10 may be connected together via a network connection such as the Internet, an extranet, or any other cloud-based network where communication is facilitated. The components of the computer 10, such as the memory 14, may be house and/or stored remote from the processor 12, or other components, and communicate through a network connection. Any configuration of the components of the computer 10 may be possible.

FIG. 2 is a schematic illustration of a computer-based crowd pricing system 110 having tier-based ratings, in accordance with a second exemplary embodiment of the present disclosure. The computer-based crowd pricing system 110 having tier-based ratings, which may be referred to herein simply as 'system 110' includes a non-transitory memory 112 having a plurality of instructions executable by a processor 114. A pricing table 122 is hosted on the non-transitory memory 112. The pricing table 122 has a plurality of pricing tiers (FIGS. 4-7) wherein the pricing table is correlated to at least one downloadable media item 130. A download popularity value 142 is calculated based on a quantity of downloads of the at least one downloadable media item 130 within an evaluation period. A position of the at least one downloadable media item 130 is movable between the plurality of pricing tiers based on the download popularity value 142, wherein position movement of the at least one downloadable media item 130 is regulated by at least one control factor 152. A ratings designation 162 paired with each of the plurality of pricing tiers. The ratings designation has a cumulative user ratings score 164 calculated by the processor 114, wherein the cumulative user ratings score 164 provides an indication of cumulative user rating of the at least one downloadable media item 130.

The non-transitory memory 112 having the instructions executable by the processor 114 may be enabled as a computerized device, as described relative to FIG. 1 or as is known within the art. Components of the system 110 may be housed, enabled, or operated from the non-transitory memory 112 or other memory devices or databases in other computerized devices, including remote servers and user computers 116.

The system 110 may be constructed as a computerized system having a plurality of modules stored within the non-transitory memory 112. Each module may be correlated with instructions within the non-transitory memory 112, each of which may relate to a specific aspect or function of the system 110. As is shown in FIG. 2, the system 110 may include a pricing table module 120 having the pricing table 122, a download popularity value module 140 having the download popularity value 142, a control factor module 150 having a variety of control factors 152, and a ratings designation module 160 having the ratings designation 162, among other modules. It is noted that other modules known in the art may also be included, such as security modules, login/registration modules, messaging modules, advertisement modules, and other, all of which are considered within the scope of the present disclosure.

The system 110 may facilitate a plurality of downloadable media items 130 to be downloaded from the system 110 or from other systems, servers, or databanks. As is shown in FIG. 2, the media items 130 may be housed within a database 118 of the system 110. The downloadable media items 130 may include any type of media, including textual media such as e-books, written articles, etc., auditory and/or visual media, such as music, videos, graphics, etc., or other types of media items.

The pricing table 122 is hosted on the non-transitory memory 112 and is accessible by at least a portion of the users of the system 110, namely those users who have been granted access to the system 110. It is understood that access to the system 110 may be granted automatically, such as when a user visits the system 110 via a website, through the use of a login and password, or by select invitation, registration, or access. The pricing table 122 may be visually displayable on a display device of the user's computerized device. The display device may include a computer monitor, a portable display device, such as a smart phone or tablet, or any other type of graphical user interface.

The pricing table 122 has a plurality of pricing tiers (FIGS. 4-7) wherein the pricing table is correlated to at least one downloadable media item 130. In other words, at least one media item 130 is keyed to the pricing table 122 such that the user can view the pricing table data for that media item 130. As described in further detail relative to FIGS. 4-7, the pricing table may have any number of pricing tiers which are defined by different prices. For example, the pricing tiers may range from $0.0 per the media item 130 to any higher price, and at any increment between pricing tiers. It may be common to have a certain number of pricing tiers, such as eight, and have a maximum price specified, such as $9.99 per media item 130. Often, the media items 130 will be moved between pricing tiers at predetermined time intervals referred to as 'evaluation periods.' While some movement of the media items 130 between pricing tiers may be controlled to occur at the end of an evaluation period, it is also possible for movement during an evaluation period, as will be described further herein.

During use of the system 110 users will be able to view downloadable media items 130 and download them to their personal computing devices. The system 110 via the processor 114 and other components may record the data relative to media item 130 downloads, including what specific media items 130 are being downloaded, when they're downloaded, the quantity of downloads, the time of downloads, user-specific information relative to downloads (such as user traits and interested), and other data relative to the downloads. A download popularity value 142 is calculated for the media item 130 based on a quantity of downloads of the at least one downloadable media item 130 within the evaluation period. For example, the system 110 may record that a specific e-book was downloaded 1,000 times within a two-week evaluation period. Calculation of the download popularity value 142 may be completed in accordance with various formulae and algorithms, as is further described relative to FIG. 4.

A position of the at least one downloadable media item 130 is movable between the plurality of pricing tiers based on the download popularity value 142. In other words, specific pricing tier on the pricing table that the media item 130 is keyed to may be moved based on how popular of a downloaded item that media item 130 is or was. As a general rule, the more popular media items 130 will have higher download popularity values 142, which in turn, will move the position of the media item 130 higher on the pricing table corresponding to a higher price. In contrast, the less popular the media item 130 is, the lower download popularity value 142 it will have, and the lower pricing tier position it is likely to have.

Movement of the position of the at least one downloadable media item 130 may be regulated by one or more control factors 152. Regulation of the movement of the position may be desirable to prevent 'churn' which is where free or low-priced media items 130 generate tremendous download popularity, and thus are moved to an upper tier. However, once at that upper tier, these media items 130 then see a precipitous decline in download popularity at the new higher price. A major aspect of the commercial value of the tiered-pricing system is the value information communicated by the current price to consumers. Excessive churn can undermine this value.

There may be a plurality of control factors 152 provided by the control factor module 150 to regulate the position movement of the media items 130 on the pricing tier to minimize excessive churn of the media item 130. One type of control factor 152 is provided by accelerated tier climbing. While most media items 130 may only move between pricing tiers at the end of an evaluation period, sometimes there exists the need to move the position of the media item 130 prior to the end of the evaluation period. For example, a media item 130 may be moved up in pricing tiers before the evaluation period is complete if it has particularly high downloads, thereby giving it a high download popularity value. The decision to accelerate movement may be based on a number of downloads of the media item 130 before an end of the evaluation period exceeding a definable metric of downloads at a next higher tier of the plurality of pricing tiers in a preceding evaluation period. Also, the decision to accelerate movement may be based on the number of downloads of the media item 130 before an end of the evaluation period exceeding the definable metric of downloads of an average of multiple prior evaluation periods.

The definable metric may include one or more of a minimum number of downloads, a median number of downloads, a mean number of downloads, and a standard deviation from the median number of downloads. Or, if there has been general growth in downloads at all tiers over time for a particular media item 130, the definable metric may be based on extrapolated values for the tiers, either with the other definable metrics or in place of the other definable metrics. It is possible for a media item 130 to be moved multiple times during an evaluation period, thereby allowing the media item 130 to incrementally move to a next higher pricing tier within any given period of time.

It is important that the pricing tier climbing does not enable poorer performing media items 130 to achieve higher pricing tiers than better performing media items 130. Thus, in addition to the controls with accelerating movement of the media item 130, it is desirable to confirm that the media items 130 in the pricing tier to which the advancing media item 130 would be moved are not also performing better during this evaluation period. As an example, if title X download volume during the current evaluation period exceeds the max download volume during the prior evaluation period of the best title currently in the next higher tier, and if title X download volume exceeds the median download volume of the next higher tier during the current evaluation period, then title X would be immediately moved to the next higher tier.

Another control factor 152 is a buffered tier decline, which controls a decreasing position movement of the media item 130. For example, the decreasing position movement may be limited to one pricing tier of the plurality of pricing tiers per the evaluation period. Other control factors 152 may also exist and be utilized with the system 110

In combination with the pricing tiers of the system 110, it is often necessary to determine the value or perceived value of the media item 130. For example, when a media item 130 is downloadable at no cost, users often find that the value of the media item 130 is high, since it cost nothing to obtain. However, when the media item 130 costs a higher amount, such as $9.99, a user wants assurance that he or she is getting good value for the price he or she is about to pay. The system 110 incorporates a ratings designation 162 paired with each of the plurality of pricing tiers, thereby giving the user or potential purchaser an average overall rating for the media item 130 at each price tier. This ratings designation 162 in combination with the tiered pricing can indicate whether the media item 130 is a good value at a specific pricing tier, thereby giving the user greater information about the media item 130 such that they can make an informed choice on whether to purchase the media item 130 or not.

The ratings designation 162 may be based on a cumulative user ratings score 164 calculated by the processor 114. The cumulative user ratings score 164 provides an indication of cumulative user rating of the at least one downloadable media item 130. There are a variety of ways to create the cumulative user ratings score 162. For example, it may be based on an overall rating of the at least one downloadable media item 130, e.g., with a simple overall rating of how the user liked the media item 130, or it may be based on at least two attributes of the at least one downloadable media item 130, e.g., whether the user thought the media item 130 was engaging, entertaining, or had some other attribute such that the user believed the media item 130 was a good value.

The ratings designation 162 and cumulative user rating score 164 may be used as one of the factors in determining which position the media item 130 is at on the pricing table. For example a high cumulative user rating score 164 could contribute points to the ranking formula and a low cumulative user rating score 164 could detract. Further, the cumulative user rating score 164 provides the user with valuable feedback as to the price of the media item 130. Without the cumulative user rating score 164, popularity of the media item 130 is based solely on downloads. Free or inexpensive media items 130 would have a propensity to have higher popularity regardless of their actual quality, whereas higher-priced media items 130 may have less popularity even if they are high in quality. The cumulative user rating score 164 may bridge the gap between pricing, download popularity, and value.

FIG. 3 is a schematic illustration of a tier-points table 172 used with the computer-based crowd pricing system 110 having tier-based ratings, in accordance with the second exemplary embodiment of the present disclosure. The system 110 may also include a sustained performance unit 170 calculating a point value award to the media item 130. The point value award may be calculated as a factor of a pricing tier level of the plurality of pricing tiers of the media item 130.

Relative to FIGS. 2-3, downloads of a media item 130 at a higher price reflect greater interest in that media item 130 than the same number of downloads in a lower tier, because consumers have paid more for that download than they would have paid were it in a lower tier. Therefore, a media item 130 that has reached the highest pricing tier and held the top position has demonstrated greater value to consumers than a media item 130 that achieved similar download volume at a lower price. Using a points system for determining ranking where a download in a lower tier counts for fewer points than downloads in a higher tier can better reflect recent value. Thus, a media item 130 which is at a higher tier may receive more points than a media item 130 at a lower tier for a given period of time. How the points are awarded may provide weighted values for media items 130 based on their position within the pricing tiers relative to other media items 130 and/or other pricing tiers.

Points can be calculated or reflected as a function and/or a lookup table. When the points are reflected as a function, the specific mathematical calculations may be completed in accordance with a variety of algorithms. For example, the function may be based on an exponential decay sequence, a Fibonacci, sequence, a multiple or derivative of a sequence, such as a multiple of the Fibonacci sequence, or another type of algorithm. With the Fibonacci sequence, the point award may be: 1 point for the first/bottom tier, 1 point for the second tier, 2 points for the third tier, 3 points for the fourth tier, 5 points for the fifth tier, and 8 points for the sixth tier, and so on. When a multiple of the Fibonacci sequence is used, the point aware may be: 10 points for the first/bottom tier, 10 points for the second tier, 20 points for the third tier, 30 points for the fourth tier, 50 points for the fifth tier, and 80 points for the sixth tier, and so on. It may be preferable for the algorithm to provide a sequence with a natural progression, such that the number of points given to the media item 130 for a specific tier follows a natural lifespan of the media item 130.

A simple example of the function would be: each media item 130 receives X points per tier during completed evaluation period, where X is a variable or function. If X=1, then a media item 130 gets 1 point per download in the first tier and 7 per download in the seventh tier. For heavier weighting of more expensive media items 130, the value of X increases. For reduced weighting of price, the value of X may be reduced. X could also itself be a function, for more complex treatment, which allow tuning churn rates at different tier levels. This determination can be extended by adding a factor and including multiple prior evaluation periods. In this model, the function above changes to: each media item 130 receives X Points per tier during completed evaluation period plus Y points per tier during the prior evaluation period plus Z points per tier during prior evaluation period, and so forth. Any number of variables may be used to represent different types of considerations with reflecting the points as a function.

When the tier-points table 172 is used, it may allow for any number of points for each pricing tier. As is shown in the tier points table 172 in FIG. 3, the listed number is multiplied by the number of downloads for that media item 130 during the listed evaluation period at the top of the column and summed for each media item 130. A further factor could be included where points are added to any of the above for sustained time at a certain tier. In all cases, the media items 130 may be ranked within their genre for tier placement during the new evaluation period using the sum of applicable points for each media item 130.

These different methods calculating points as a function or using a look-up table can be used in conjunction with one another. A desired application is using a combination of the control factors 152 including accelerated tier climbing and the buffered tier decline with the table lookup spanning a number of evaluation periods, as shown in the table immediately above.

FIGS. 4-7 are illustrations of pricing tables 122 having pricing tiers 124 used with the computer-based crowd pricing system 110 having tier-based ratings, in accordance with the second exemplary embodiment of the present disclosure. Consumers expect more from a purchase in a given market at a high price point than at a low price point or obtained for free. This inclination can be harnessed to improve information available to consumers in determining proper tier value. A rating system that shows at a glance the price at which perceived value decreases allows consumers to quickly assess value, facilitating the purchase experience, increasing trust in the associated marketplace, and increasing gross transaction revenue.

As shown in FIGS. 4-7, a media item 130 may receive at least one rating in each tier it reaches (only one rating criterion is included in the figures, which would correspond to the "overall" rating, but other attributes may also be rated for each included media item 130). The system 110 may make several pieces of information immediately visible to consumers, including which tier the media item 130 has reached, the rating at each tier, the current tier, and taken together, the appropriate pricing or value for that media item 130. The top tier reached may be communicated based on the number rows of stars. FIG. 4 shows a media item 130 that has never exceeded free, FIG. 5 has reached $CP2.99, and both FIGS. 6 and 7 have reached the full $CP8.99 tier. The number of colored stars shows the average rating it received at that tier. FIGS. 4 and 7 both show maximum ratings for their tier (at free and $CP8.99). FIG. 5 shows two rows with fractional ratings, 3.5 at $CP 0.49 and 4.5 at $CP 0.29. Fractional ratings can be any fraction (i.e., could be 3.22).

The highlighted text and heavy borders highlight the current tier may act as a current tier indicator 126. If there are rows of stars above that current tier indicator 126, it means the media item 130 previously reached a higher tier and has come back down, as shown in FIGS. 5 and 6. At a glance, this shows appropriate aggregate value perception by revealing at which tier the number of stars begins to drop. The number of reviews, and number of downloads could also be listed in close proximity to each rating row, showing how many of each occurred at each tier. This could be further extended by showing total over time and most recent evaluation period, which may be defined as the time during which downloads are counted for tier placement. A default evaluation period of two weeks has been conventionally used.

Figure 8:
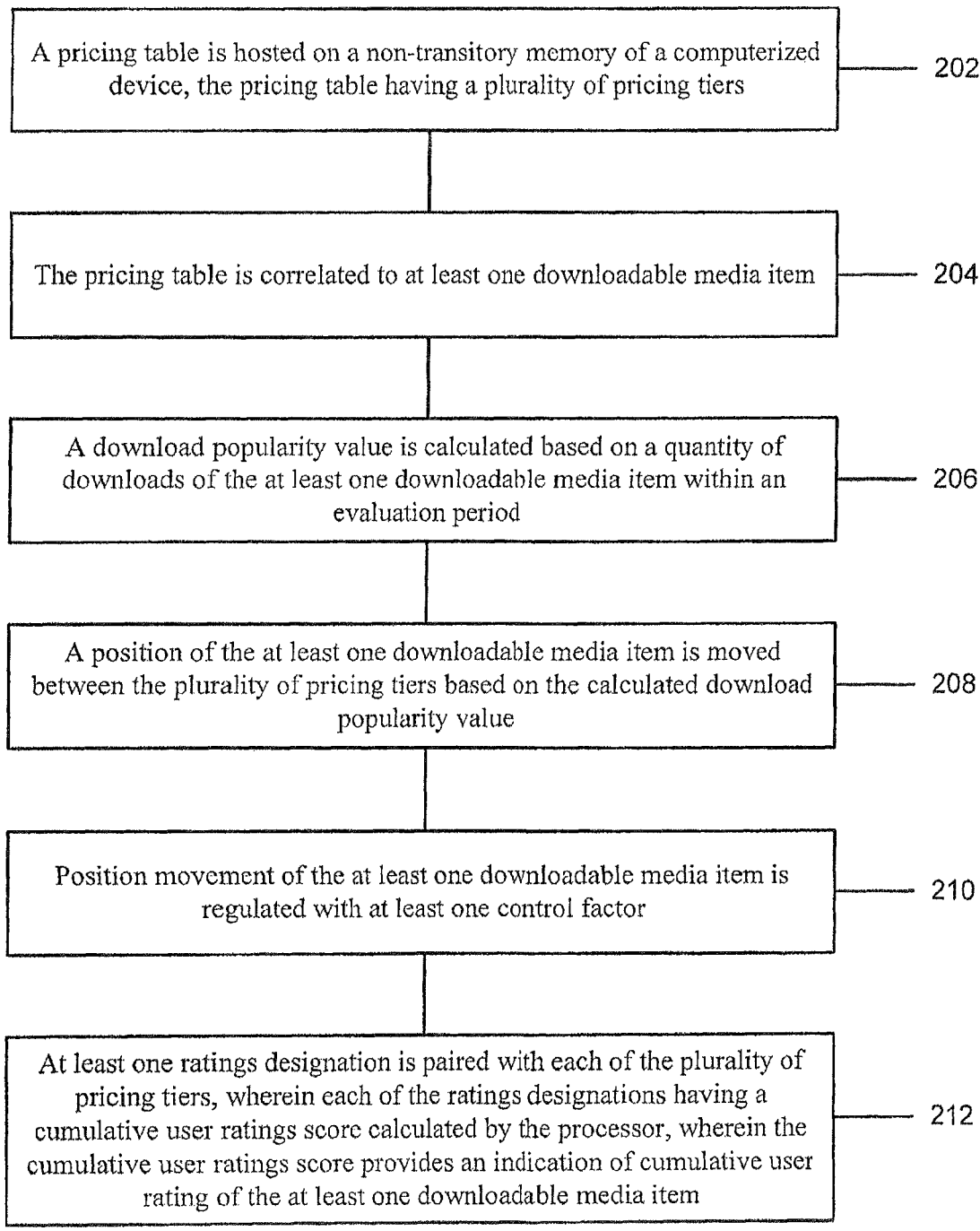
FIG. 8 is a flowchart illustrating for providing a crowd pricing system having tier-based ratings, in accordance with a third exemplary embodiment of the disclosure.

FIG. 8 is a flowchart 200 illustrating for providing a crowd pricing system having tier-based ratings, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a pricing table is hosted on a non-transitory memory of a computerized device, the pricing table having a plurality of pricing tiers. The pricing table is correlated to at least one downloadable media item (block 204). A download popularity value is calculated based on a quantity of downloads of the at least one downloadable media item within an evaluation period (block 206). A position of the at least one downloadable media item is moved between the plurality of pricing tiers based on the calculated download popularity value (block 208). Position movement of the at least one downloadable media item is regulated with at least one control factor (block 210). At least one ratings designation is paired with each of the plurality of pricing tiers, wherein each of the ratings designations having a cumulative user ratings score calculated by the processor, wherein the cumulative user ratings score provides an indication of cumulative user rating of the at least one downloadable media item (block 212).

The method may further include a plurality of other steps, processes, and functions, including any disclosed relative to any other figure within this disclosure. For example, the at least one control factor may include an accelerated tier climbing factor, wherein the position movement of the at least one downloadable media item is increased within the evaluation period based on the accelerated tier climbing factor. The at least one control factor may also include a buffered tier decline factor, wherein decreasing a position movement of the at least one downloadable media item based on the buffered tier decline factor. The decreasing position movement may be limited to one pricing tier of the plurality of pricing tiers per the evaluation period.

A point value award to the at least one downloadable media item may be calculated with a points and sustained performance unit, wherein the point value award is calculated as a factor of a pricing tier level of the plurality of pricing tiers of the at least one downloadable media item. Calculation of the point value award may be done as a factor of the pricing tier level of the at least one downloadable media item during the evaluation period and as a factor of the pricing tier level at a previous evaluation period. The points and sustained performance unit may utilize or include a tier-points table, wherein the point value award is retrievable from the tier-points table. A current tier position of the at least one downloadable media item may be indicated within the plurality of pricing tiers using a current tier indicator.

While the system 110 and methods are described herein relative to certain embodiments and uses, other uses, features, and systems may also be included with the system 110. These additional or related uses, features, and systems may include the following:

Synchronizing Media Across Disparate Proprietary Platforms:

By counting paragraphs in a text document (including electronic forms of publication) and audio or video playtime in digital media, a player of either form of media on any device can then communicate back to a central server the paragraph count or the time in the media stream. At the central server, there is a look-up table for every title that correlates the paragraph number in the text with the time in the media stream. The server can communicate with otherwise incompatible forms of media to enable synchronization.

For example, a person could read an eBook or text on the Kindle, reach paragraph 147, then stops. Before it shuts down it sends their paragraph number to the central server for that user and title combination. Later that day, perhaps in their car, the user turns on their iPhone and selects the same story that they had been reading. It checks in with the central server and is told to jump to 38 minutes into the media stream, which the central server has correlated with paragraph 147 in the text.

Streaming Content:

Sites such as YouTube offer digital streaming, but provide no means for the developers of that content to prove monetizeability, which is a prime goal of many fledgling film developers. The price-based popularity model described by Colin Higbie would work equally well for streaming content, whether audio or video.

Social Media Integration:

Traditionally, social network pages (Facebook, MySpace, and even brief postings like Twitter) are purely person-centric. Yes, permitted friends can respond in some cases, but these have always been kept entirely separate from discussion groups. Because of this separation, no social networking site has ever successfully become the center for discussion on any particular topic. Yet membership in discussion groups tends to be limited. While this level of exclusivity makes sense for niche or technical discussion areas where the majority of the public would not be qualified to engage, it misses the main opportunity for discussing mass market social entertainment like books, movies, music, etc.

Similarly, for social media to maximize their relevance, they will need to go beyond individual postings about what each member did that day, to enable aggregate discussions pooled from multiple users' accounts. But due to desire for privacy among users, this is best achieved by enabling any user to select any thread that user initiates on his or her page and simply check a "Go Global" box, indicating that the particular topic is open to discussion by any member of the social networking site.

Furthermore, because this move takes control away from the original poster and potentially opens it up for hundreds or thousands of posts, the user also needs a "Remove from my site" and/or a "Compress" option that either removes the content from the original poster's home page or simply compresses it into a hyperlink to the new global page.

Interactive Content Games—WhatIF?™ Games:

WhatIF?™ stands for Writer's Interactive Fiction. WhatIF?T™ games are a combination of audiobook and computer game. They address a previously unaddressed market segment—interactive computer games for drivers, the visually impaired, and those with other disabilities that make using mouse, keyboard, or other game controllers difficult.

1. The user/player listens to a description of the situation recorded by the author and any voice actors or music relevant to the scene.

2. The user/player then issues a spoken command from a set of available action verbs and an object of the command, if appropriate. Examples: Open desk drawer, Climb ladder, Punch the shadowy figure. The user/player can always command "Describe the location" or "Describe <object name>", ask "What am I carrying?" and "How is my health?"

3. The WhatIF?™ game responds with the pre-recorded results of the executing the command. This could be a further description, "The desk drawer is locked," suggesting the user/player will need to find a means of unlocking it, such as a key or letter opener to pick the lock. Responses could also advance the mystery story as in, "Opening the desk drawer reveals a will and a .38 revolver." There could also be a standard response for an action that was not relevant to the story or considered by the author, as in some variant on, "Nothing happens" or "You can't do that here."

4. The user/player can save or bookmark progress in any locations permitted by the author (default is all locations), to return to that point in the future.

5. Through repetition of #1-#4, the user/player experiences the interactive fiction, solves the puzzles, lives the life of a character, or whatever else the author had intended for the experience.

For the author, the structural composition involves the following elements:

An introduction. This sets up the story and is played without interruption at the start of the game.

A series of initial/default location descriptions. These are played the first time the user/player enters a new location. They can also be repeated at the user/player's request.

Modified location descriptions. Various events can cause a room or place to change.

These modified descriptions are read if the user/player is in the room when it changes, or the first time the user/player returns to the room since it has changed. They can also be repeated at the user/player's request.

Objects. The user/player can carry objects. Like locations, objects have descriptions that the user/player hears the first time he/she sees the object and after that only on request. The user/player may carry objects, in which case they move with the user/player from place to place. The user/player may or may not start with any objects in his/her possession. All objects are found in a location, though they may not be in the initial location. For example, a will in the desk drawer in the office would not be visible until the user/player opened the desk drawer. The author defines an object as such during design and they are distinct from the description of a location, which may have include a detailed list of the contents of the room, yet only 1 or 2 of those items may be actual game objects that the user/player can pick up and carry. Objects may be able to be combined with other objects are have custom commands/verbs that yield unique results. For example, if the user/player is carrying a dead cell and also found a battery for it, he/she could command, "Put battery in dead cell phone" which would then convert it to a working cell phone, which would be a new object created by the action and also result in the removal of the dead cell phone object from the user/player's possession.

Characters. The user/player may engage in dialog with any character in the game. The author pre-records responses to the conversation options he/she has considered or wants available to the user/player. There must always be a default response for non-relevant commands by the user/player. These could be generic responses, "Steve shrugged," or simply state that such a question or command is not appropriate, "Steve doesn't have anything to say on that subject."

Multiple possible ending options. Endings are triggered by one of the following:

Reaching a particular location with a particular object.

Death, with optionally different descriptions depending on the location the character dies and/or objects in the character's possession.

Saying a particular word or phrase to a particular character

Optionally, there may be containers. These are objects that can hold other objects. These likely add unnecessary complexity to both author and user/player and are not recommended. However, if there are a large number of objects, this may be helpful to reduce the number of objects available at any moment by storing several in a single container.

Optionally, random results. The author can specify the percentage likelihood of each possible outcome. Possession of certain objects can change the percentage outcomes. This would move away from interactive fiction, but would also allow for more replay opportunities within a given game.

There are additional features the author may choose to use/configure:

There are a default set of commands included for the author that allow the user to move between locations, replay the description of a location or object, pick up or drop any object, talk to any character in the game, and use objects.

The user/player's character has at least two values set by the author: 1) How many objects the user/player can have in his/her possession (default unlimited), and 2) A health meter that varies based on game events and ends the game if it reaches zero (default 100% at the start of the game but could be less, e.g., the game begins by the user/player's character washing up on shore after a plane crash, so the health meter starts close to zero). The author sets if any events in the game cause damage or restore health. These would occur as the result of a command and could be concurrent with a change to an object or a location.

Background audio/music. This runs steadily in the background independent of any particular action, but can be set to change upon any particular command (including object commands or moving between locations) or conversation result.

The author can add new commands that affect specific locations or objects.

The development tools enable the author and/or voice actors to record the object and location descriptions and character responses. It also allows for recording background music, that is either part of the description or as a constant background track. They let the author specify starting locations for every object, including an N/A value for objects that don't exist until the user/player causes them to appear (e.g., opening the desk drawer "creates" a well and a .38 revolver, putting the battery into the dead cell phone creates a working cell phone).

The toolset will also provide analysis as part of the final process to ensure no two command words or objects are phonetically so similar that the speech recognition system may confuse the user/player's intent. During gameplay, where each object may have its own set of available commands, the system will similarly use intelligence to recognize that only certain combinations of command and object words are possible to minimize misunderstood speech commands.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A data processing system for configuring downloadable media content in tier-based ratings for download over an electronic network connection, the system comprising:
   a plurality of downloadable media items stored within a database;
   a plurality of user computing devices in communication with the database through the electronic network connection, wherein each of the plurality of user computing devices has a visual display screen with a user interface, and wherein the plurality of downloadable media items are accessible to the user computing devices over the electronic network connection;
   a host server in communication with at least the database, the host server having:
      a non-transitory memory with a plurality of instructions executable by a processor;
      a pricing table hosted on the non-transitory memory and displayable on display screens of each of the user computing devices, the pricing table having a plurality of pricing tiers, wherein the pricing table is correlated to at least one downloadable media item of the plurality of downloadable media items, wherein a purchase price of the at least one downloadable media item is displayed on the pricing table;
      wherein a download popularity value is calculated by the processor based on a quantity of downloads of the at least one downloadable media item from the database of the hosting server within an evaluation period, wherein a position of the at least one downloadable media item is movable between the plurality of pricing tiers based on the download popularity value, wherein position movement of the at least one downloadable media item is regulated by at least one control factor; and
      a ratings designation provided to the at least one downloadable media item for each of the plurality of pricing tiers the at least one downloadable media item has reached, the ratings designation having a user ratings score calculated by the processor at each of the plurality of pricing tiers and a cumulative user ratings score calculated by the processor, wherein the cumulative user ratings score is based on at least;
      the pricing tier reached by the at least one downloadable media item;
      the user ratings score of the at least one downloadable media item at each pricing tier; and
      a current pricing tier of the at least one downloadable media item, wherein the cumulative user ratings score provides an indication of cumulative user rating of the at least one downloadable media item;
      and wherein a graphical image of each of the plurality of pricing tiers and the corresponding ratings designation for each pricing tier are both simultaneously displayed on the visual display screens of each of the user computing devices.

2. The data processing system of claim 1, wherein the at least one control factor further comprises an accelerated tier climbing factor, wherein the accelerated tier climbing factor increases position movement of the at least one downloadable media item within the evaluation period.

3. The data processing system of claim 2, wherein the accelerated tier climbing factor is based on at least one of:
   before an end of the evaluation period, a number of downloads of the at least one downloadable media item exceeding a definable metric of downloads at a next higher tier of the plurality of pricing tiers in a preceding evaluation period; and before an end of the evaluation period, the number of downloads of the at least one downloadable media item exceeding the definable metric of downloads of an average of multiple prior evaluation periods.

4. The data processing system of claim 3, wherein the definable metric includes at least one of: a minimum number of downloads, a median number of downloads, a mean number of downloads, and a standard deviation from the median number of downloads.

5. The data processing system of claim 1, wherein the at least one control factor further comprises a buffered tier decline factor, wherein the buffered tier decline factor controls a decreasing position movement of the at least one downloadable media item, wherein the decreasing position movement is limited to one pricing tier of the plurality of pricing tiers per the evaluation period.

6. The data processing system of claim 1, further comprising a points and sustained performance unit calculating a point value award to the at least one downloadable media item, wherein the point value award is calculated as a factor of a pricing tier level of the plurality of pricing tiers of the at least one downloadable media item.

7. The data processing system of claim 6, wherein the point value award is calculated as a factor of the pricing tier level of the at least one downloadable media item during the evaluation period and as a factor of the pricing tier level at a previous evaluation period.

8. The data processing system of claim 6, wherein the points and sustained performance unit further comprises a tier-points table, wherein the point value award is retrievable from the tier-points table.

9. The data processing system of claim 1, wherein the cumulative user ratings score is based on at least two attributes of the at least one downloadable media item.

10. The data processing system of claim 1, further comprising a current tier indicator of the at least one downloadable media item within the plurality of pricing tiers.

11. The data processing system of claim 1, wherein a perceived value of the at least one downloadable media item is achieved relative to at least one of the pricing tiers of the plurality of pricing tiers.

12. A method of distributing downloadable media items through a computerized network to a plurality of user computing devices using a pricing system having download demand, tier-based ratings, the method comprising the steps of:

hosting a plurality of downloadable media items on a database of a centralized computerized device, each of the plurality of downloadable media items having a purchase price, wherein the purchase prices are stored in a pricing table on a non-transitory memory of the computerized device, wherein the pricing table has a plurality of pricing tiers, wherein the plurality of pricing tiers are displayable to a plurality of users each having a user computing device in communication with the centralized computerized device through an electronic network connection, wherein each of the plurality of user computing devices has a visual display screen with a user interface;

correlating the pricing table to each of the plurality of downloadable media items;

downloading, by the plurality of users each having the user computing device, at least one of the plurality of downloadable media items from the database to each of the user computing devices, respectively;

calculating, by a processor, a download popularity value based on a quantity of downloads of the at least one downloadable media item from the plurality of users within an evaluation period;

moving, by the processor, the purchase price of the at least one downloadable media item between the plurality of pricing tiers based on the calculated download popularity value;

regulating position movement of the at least one downloadable media item between the plurality of pricing tiers with at least one control factor;

incorporating at least one ratings designation to the at least one downloadable media item for each of the plurality of pricing tiers the at least one downloadable media item has reached, wherein each of the ratings designations having a user ratings score calculated by the processor at each of the plurality of pricing tiers and a cumulative user ratings score calculated by the processor, wherein the cumulative user ratings score is based on at least:

the pricing tier reached by the at least one downloadable media item;

the user ratings score of the at least one downloadable media item at each pricing tier; and a current pricing tier of the at least one downloadable media item, wherein the cumulative user ratings score provides an indication of cumulative user rating of the at least one downloadable media item; and simultaneously visually displaying a graphical image of each of the plurality of pricing tiers and the corresponding ratings designation for each pricing tier on the visual display screens of each of the user computing devices.

13. The method of claim 12, wherein the at least one control factor further comprises an accelerated tier climbing factor, further comprising the step of increasing the position movement of the at least one downloadable media item within the evaluation period based on the accelerated tier climbing factor.

14. The method of claim 12, wherein the at least one control factor further comprises a buffered tier decline factor, further comprising the steps of:

decreasing a position movement of the at least one downloadable media item based on the buffered tier decline factor; and limiting the decreasing position movement to one pricing tier of the plurality of pricing tiers per the evaluation period.

15. The method of claim 12, further comprising the step of calculating a point value award to the at least one downloadable media item with a points and sustained performance unit, Wherein the point value award is calculated as a factor of a pricing tier level of the plurality of pricing tiers of the at least one downloadable media item.

16. The method of claim 15, wherein the point value award is calculated as a factor of the pricing tier level of the at least one downloadable media item during the evaluation period and as a factor of the pricing tier level at a previous evaluation period.

17. The method of claim 15, wherein the points and sustained performance unit further comprises a tier-points table, wherein the point value award is retrievable from the tier-points table.

18. The method of claim 12, further comprising the step of indicating a current tier position of the at least one downloadable media item within the plurality of pricing tiers using a current tier indicator.

19. A computerized system for providing downloadable media to a plurality of users with interactive-based pricing tiers based on download demand, the computerized system comprising:
- a database within a centralized server, the database storing a quantity of downloadable media items;
- a plurality of user computing devices communication with the centralized server through an electronic network connection, wherein each of the plurality of user computing devices has a visual display screen with a user interface, and wherein the quantity of downloadable media items are accessible to the user computing devices over the electronic network connection;
- a non-transitory memory within the centralized server and having a quantity of instructions executable by a processor;
- a plurality of modules stored within the non-transitory memory, wherein the quantity of instructions are correlated with at least one of the plurality of modules, wherein the plurality of modules comprises:
    - a pricing table module hosted on the non-transitory memory, the pricing table module visually displaying on a display screen of the user computing devices a pricing table having a plurality of pricing tiers, wherein the pricing table is correlated to at least one downloadable media file of the quantity of downloadable media, wherein a purchase price of the at least one downloadable media file is visually displayed within the pricing tiers next to at least one of: a textual identifying title of the at least one downloadable media file and a picture of the at least one downloadable media file;
    - a download popularity value module calculating a download popularity value based on a quantity of downloads of the at least one downloadable media file by the user computing devices within an evaluation period, wherein the at least one downloadable media file is movable between the plurality of pricing tiers based on the download popularity value, wherein position movement of the at least one downloadable media file is regulated by at least one control factor; and
- a ratings designation module providing a ratings designation to the at least one downloadable media item for each of the plurality of pricing tiers the at least one downloadable media item has reached, each ratings designation having a user ratings score calculated by the processor at each of the plurality of pricing tiers and a cumulative user ratings score calculated by the processor, wherein the cumulative user ratings score is based on at least:
- the pricing tier reached by the at least one downloadable media item;
- the user ratings score of the at least one downloadable media item at each pricing tier; and
- a current pricing tier of the at least one downloadable media item, wherein the cumulative user ratings score provides an indication of cumulative user rating of the at least one downloadable media file, and wherein a graphical image of each of the plurality of pricing tiers and the corresponding ratings designation for each pricing tier are both simultaneously displayed on the visual display screen of each of the user computing devices.

* * * * *